United States Patent
Vasquez

(10) Patent No.: US 9,082,419 B1
(45) Date of Patent: Jul. 14, 2015

(54) DISK DRIVE CONFIGURING POWER MODE OF DISK DRIVE RELATIVE TO SERVO GATE

(75) Inventor: Steven R. Vasquez, Rancho Santa Margarita, CA (US)

(73) Assignee: Western Digitial Technologies, Inc., Irvine, CA (US)

( * ) Notice: Subject to any disclaimer, the term of this patent is extended or adjusted under 35 U.S.C. 154(b) by 1211 days.

(21) Appl. No.: 12/480,576

(22) Filed: Jun. 8, 2009

(51) Int. Cl.
*G11B 5/09* (2006.01)

(52) U.S. Cl.
CPC ........................................ *G11B 5/09* (2013.01)

(58) Field of Classification Search
None
See application file for complete search history.

(56) References Cited

U.S. PATENT DOCUMENTS

| | | | |
|---|---|---|---|
| 5,345,347 A | 9/1994 | Hopkins et al. | |
| 5,452,277 A | 9/1995 | Bajorek et al. | |
| 5,544,138 A | 8/1996 | Bajorek et al. | |
| 5,638,541 A | 6/1997 | Sadashivaiah | |
| 5,648,738 A | 7/1997 | Welland et al. | |
| 5,682,273 A | 10/1997 | Hetzler | |
| 5,787,292 A | 7/1998 | Ottesen et al. | |
| 5,913,067 A | 6/1999 | Klein | |
| 5,954,820 A | 9/1999 | Hetzler | |
| 6,038,096 A * | 3/2000 | Zhang et al. | 360/78.04 |
| 6,192,480 B1 | 2/2001 | Barrus | |
| 6,285,521 B1 * | 9/2001 | Hussein | 360/73.03 |
| 6,378,081 B1 | 4/2002 | Hammond | |
| 6,608,729 B1 | 8/2003 | Willems et al. | |
| 6,657,811 B1 | 12/2003 | Codilian | |
| 6,725,385 B1 | 4/2004 | Chu et al. | |
| 6,845,456 B1 | 1/2005 | Menezes et al. | |
| 6,892,313 B1 | 5/2005 | Codilian et al. | |
| 6,928,559 B1 | 8/2005 | Beard | |
| 6,941,480 B1 | 9/2005 | Dai | |
| 7,058,824 B2 | 6/2006 | Plante et al. | |
| 7,089,432 B2 | 8/2006 | Schmidt | |
| 7,120,806 B1 | 10/2006 | Codilian et al. | |
| 7,143,203 B1 | 11/2006 | Altmejd | |
| 7,155,617 B2 | 12/2006 | Gary et al. | |
| 7,275,166 B2 * | 9/2007 | Kaiju et al. | 713/320 |
| 7,289,287 B2 * | 10/2007 | Takamatsu et al. | 360/69 |
| 7,302,595 B2 | 11/2007 | de Cesare et al. | |
| 7,600,136 B2 * | 10/2009 | Cheng et al. | 713/300 |
| 2002/0169990 A1 | 11/2002 | Sherburne, Jr. | |
| 2004/0083396 A1 | 4/2004 | Perahia | |
| 2004/0109255 A1 | 6/2004 | Walz | |
| 2005/0125704 A1 | 6/2005 | Brauer | |
| 2005/0174678 A1 | 8/2005 | Zayas et al. | |
| 2008/0276110 A1 | 11/2008 | Indiani et al. | |

* cited by examiner

*Primary Examiner* — K. Wong

(57) ABSTRACT

A disk drive is disclosed comprising a head actuated over a disk having a plurality of tracks, wherein each track comprises a plurality of data sectors and a plurality of servo sectors. The disk drive further comprises control circuitry including a read channel. The control circuitry configures a power mode of the read channel into a no-op mode, and when the head approaches a servo sector, configures the power mode into a servo mode. After configuring the power mode into the servo mode, the control circuitry waits for a pre-servo gate period, and after the pre-servo gate period, enables a servo gate to read the servo sector. After reading the servo sector, the control circuitry disables the servo gate and waits for a post-servo gate period. After the post-servo gate period, the control circuitry configure the power mode into the no-op mode.

16 Claims, 6 Drawing Sheets

DISK DRIVE CONFIGURING POWER MODE OF DISK DRIVE RELATIVE TO SERVO GATE

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of tracks 4, wherein the tracks are banded together in this example to form three physical zones from the inner diameter of the disk (ZONE 1) to the outer diameter of the disk (ZONE 3). The prior art disk format of FIG. 1 also comprises a number of servo sectors $6_0$-$6_N$ recorded around the circumference of each track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target track during a seek operation. Each servo sector $6_i$ further comprises groups of servo bursts 14 (e.g., A, B, C and D bursts), which comprise a number of consecutive transitions recorded at precise intervals and offsets with respect to a track centerline. The groups of servo bursts 14 provide fine head position information used for centerline tracking while accessing a track during write/read operations.

DETAILED DESCRIPTION OF EMBODIMENTS OF THE INVENTION

Figure 1:
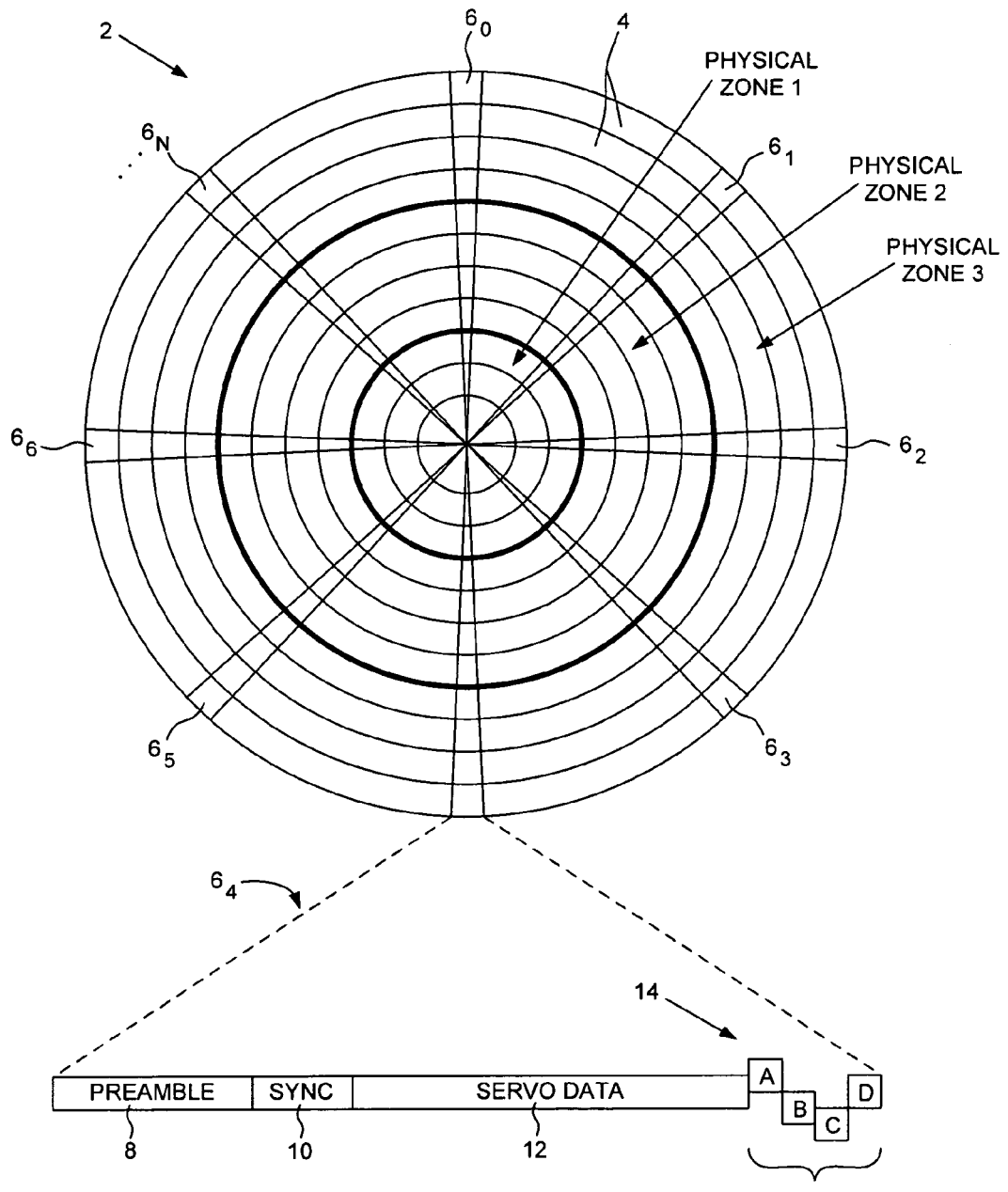
FIG. 1 shows a prior art disk format comprising a plurality of tracks defined by embedded servo sectors.
Figures 2A, 2B:
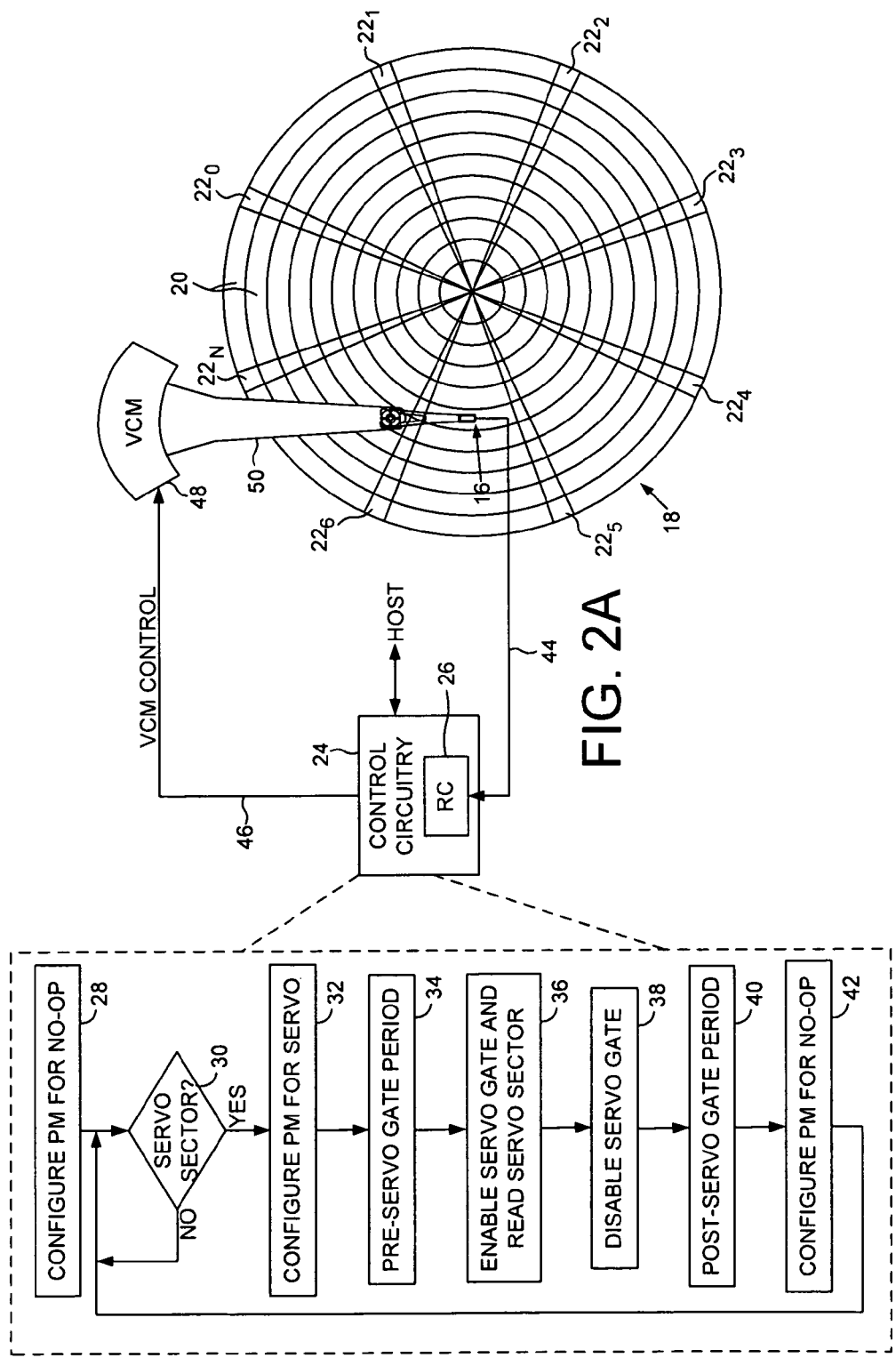
FIG. 2A shows a disk drive according to an embodiment of the present invention comprising a head actuated over a disk, and control circuitry including a read channel.
FIG. 2B is a flow diagram executed by the control circuitry according to an embodiment of the present invention for configuring a power mode of the read channel relative to a servo gate for reading the servo sectors, including a pre-servo gate period for waking the read channel prior to reading a servo sector and a post-servo gate period for flushing the servo data out of the read channel after reading the servo sector.

FIG. 2A shows a disk drive according to an embodiment of the present invention comprising a head 16 actuated over a disk 18 having a plurality of tracks 20, wherein each track comprises a plurality of data sectors and a plurality of servo sectors $22_0$-$22_N$. The disk drive further comprises control circuitry 24 including a read channel 26. The control circuitry 24 executes the flow diagram shown in FIG. 2B wherein when the disk drive is idle a power mode of the read channel is configured into a no-op mode (step 28), and when the head approaches a servo sector (step 30), the power mode is configured into a servo mode (step 32). After configuring the power mode into the servo mode, the control circuitry waits for a pre-servo gate period (step 34), and after the pre-servo gate period, enables a servo gate to read the servo sector (step 36). After reading the servo sector, the control circuitry disables the servo gate (step 38) and waits for a post-servo gate period (step 40). After the post-servo gate period, the control circuitry configures the power mode into the no-op mode (step 42).

In the embodiment of FIG. 2A, the control circuitry 24 processes a read signal 44 to demodulate the servo sectors $22_0$-$22_N$ into a position error signal (PES). The PES is filtered with a suitable compensation filter to generate a control signal 46 applied to a voice coil motor (VCM) 48 which pivots an actuator arm 50 to position the head 16 radially over the disk 18 in a direction that reduces the PES. The servo sectors $22_0$-$22_N$ may comprise any suitable position information, such as a track address for coarse positioning and servo bursts for fine positioning.

The read channel 26 of FIG. 2A may comprise any suitable circuitry for generating a suitable write signal applied to the head 16 during write operations, and for processing the read signal during read operations. For example during write operations, the read channel may use a suitable encoder (e.g., a run-length limit encoder) for encoding data prior to being written to the disk. During a read operation, the read channel may use a suitable variable gain amplifier, analog and/or digital equalizer, timing circuitry, sequence detector (e.g., a Viterbi sequence detector), data buffers, data decoders, etc. In one embodiment, there may be different components employed depending on whether the disk drive is reading user data from data sectors or the servo data from servo sectors (e.g., different sequence detector and/or data decoder). When the disk drive is idle (not processing read or write commands received from a host), components of the read channel may be configured to conserve power (e.g., by shutting down one or more components).

Even when the disk drive is idle, the control circuitry processes the servo sectors $22_0$-$22_N$ to maintain the head over a target radial location. In one embodiment, the control circuitry 24 configures a power mode of the read channel into a servo mode prior to reading a servo sector in order to give the read channel a pre-servo gate period to "wake up". After reading and demodulating the servo sector, the control circuitry 24 maintains the servo mode power configuration for a post-servo gate period to allow the servo data to be flushed out of the read channel (so it can be processed by a servo processor). After flushing the servo data out of the read channel, the power mode is reconfigured into the no-op mode in order to conserve power.

Figure 3:
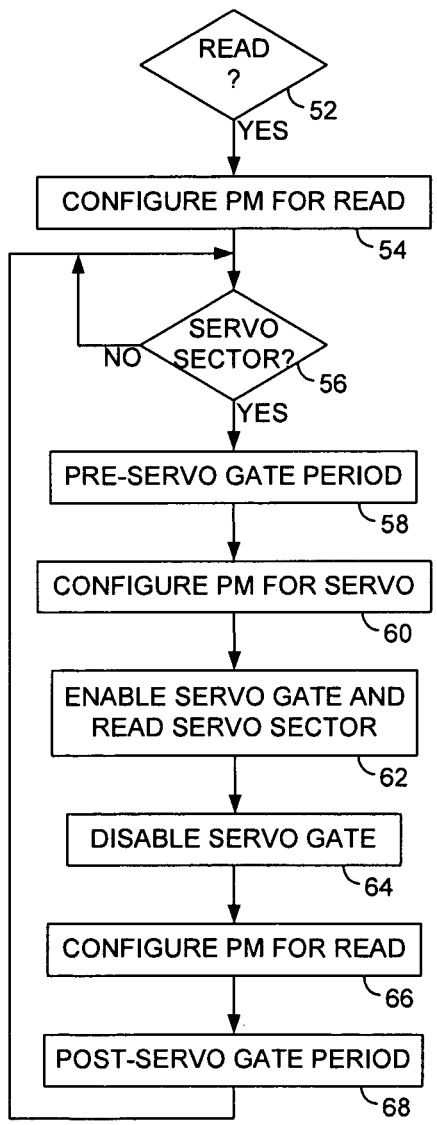
FIG. 3 is a flow diagram according to an embodiment of the present invention, wherein the read channel is configured into a read mode when executing a read operation, and into a servo mode when reading a servo sector.

FIG. 3 shows a flow diagram according to an embodiment of the present invention wherein when the control circuitry receives a read command from a host (step 52), the power mode of the read channel is configured into a read mode (step 54). When the head approaches a servo sector (step 56), the power mode remains in the read mode during the pre-servo gate period. In this embodiment, the read channel components used to read the data sectors are the same used to read the servo sectors, and therefore there is no need to wake up the read channel. After the pre-servo gate period (step 58), the power mode is configured into the servo mode (step 60). After enabling the servo gate and reading the servo sector (step 62), the servo gate is disabled (step 64) and the power mode is reconfigured back into the read mode (step 66). In this embodiment, since the power mode is configured into the read mode during the post-servo gate period (step 68), the components needed to flush the servo data out of the read channel remain active.

Figure 4:
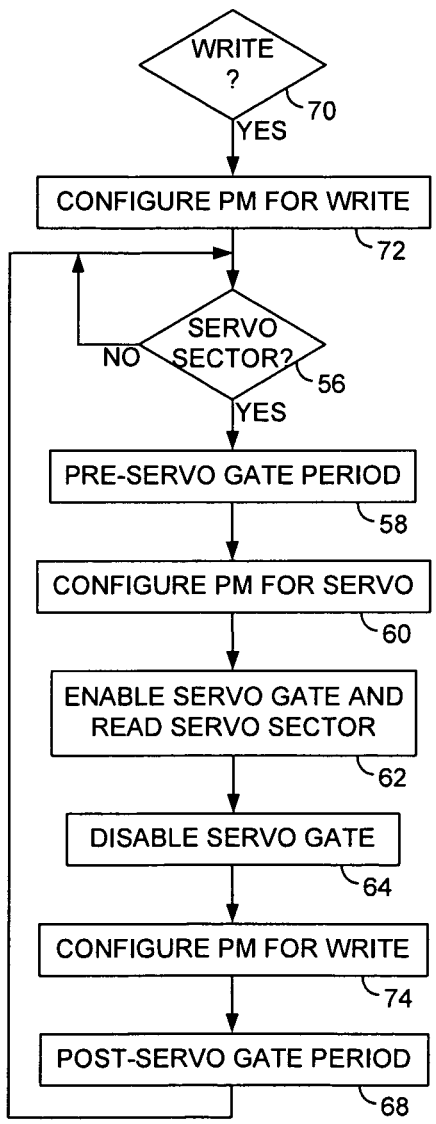
FIG. 4 is a flow diagram according to an embodiment of the present invention, wherein the read channel is configured into a write mode when executing a write operation, and into a servo mode when reading a servo sector.

FIG. 4 shows a flow diagram according to an embodiment of the present invention wherein when the control circuitry receives a write command from a host (step 70), the power mode of the read channel is configured into a write mode (step 72). After reading a servo sector (step 62) and disabling the servo gate (step 64), the power mode is reconfigured back into the write mode (step 74). In this embodiment, since the power mode is configured into the write mode during the post-servo gate period (step 68), the components needed to flush the servo data out of the read channel remain active.

Figure 5:
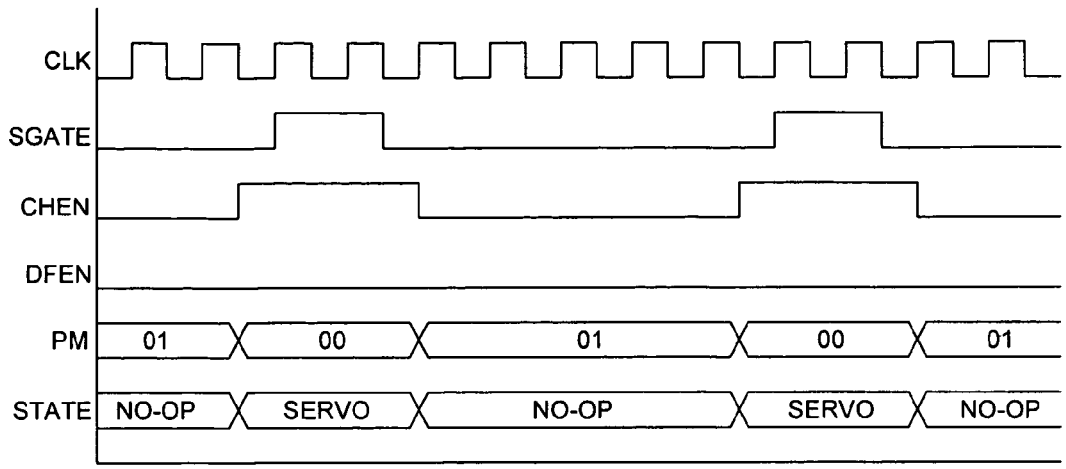
FIG. 5 is a timing diagram according to an embodiment of the present invention wherein the power mode is configured into a servo mode preceding a servo gate by a pre-servo gate period, and following the servo gate by a post-servo gate period.

FIG. 5 is a timing diagram according to an embodiment of the present invention showing a number of signals, including a clock (CLK) for clocking the control circuitry 24, a servo gate signal (SGATE) enabled when reading a servo sector, and a channel enable signal (CHEN) for timing the pre-servo gate, servo gate, and post-servo gate periods. The timing signals further include a data format enable signal (DFEN) indicating when an access command (read or write) is being executed, power mode signals (PM) for configuring a power mode of the read channel, and state values (STATE) representing the state of the read channel. In the embodiment of FIG. 5, the DFEN signal is disabled and therefore the control circuitry is in an idle mode (not processing a read or write command). Therefore when the head approaches and reads a servo sector, the power mode of the read channel is configured into the servo mode during the pre-servo gate period, the servo gate period, and the post servo gate period.

Figure 6A:
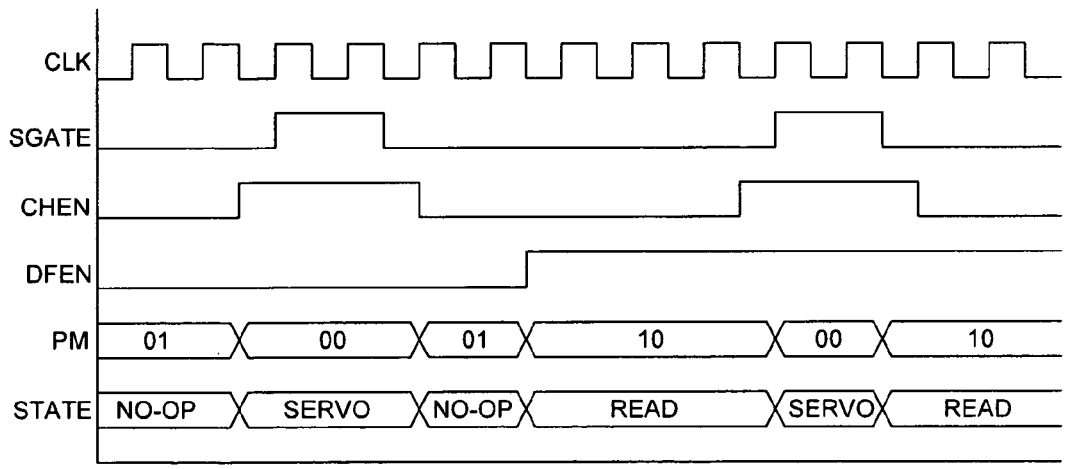
FIG. 6A is a timing diagram according to an embodiment of the present invention wherein during execution of a read command, the power mode is configured into the servo mode only when reading the servo sector (synchronous with the servo gate).

FIG. 6A is a timing diagram according to an embodiment of the present invention illustrating when the control circuitry 24 receives a read command from a host. When the read command is executed and the DFEN signal is enabled, the power mode of the read channel is configured into a read mode. When the head approaches a servo sector, the power mode remains in the read mode during the pre-servo gate period and not configured into the servo mode until the SGATE signal is enabled. Similarly, at the end of the servo gate period, the power mode is reconfigured back into the read mode during the post-servo gate period in order to continue executing the read command.

Figure 6B:
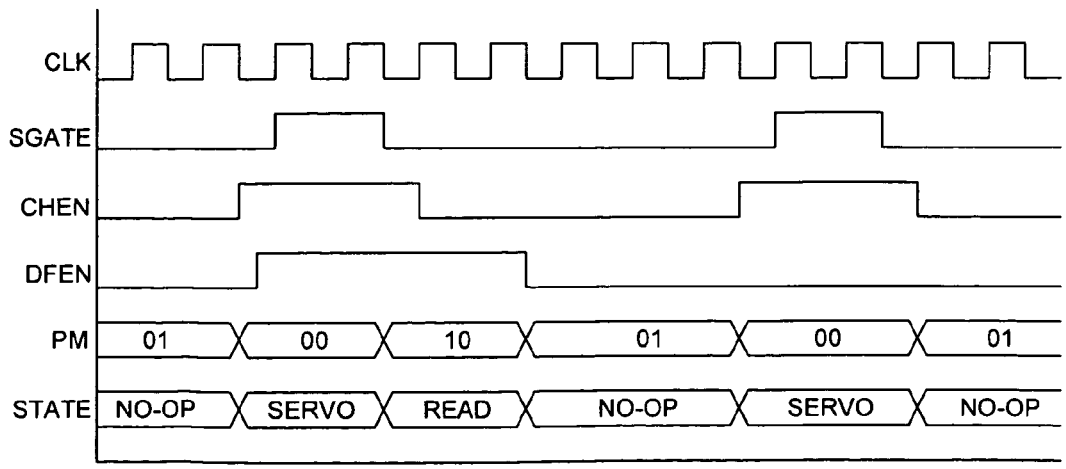
FIG. 6B is a timing diagram according to an embodiment of the present invention wherein if the read command begins during the pre-servo gate period, the power mode is configured into the servo mode at the beginning of the pre-servo gate period.

FIG. 6B is a timing diagram according to an embodiment of the present invention wherein the DFEN signal is enabled to begin a read command during the pre-servo gate period. In this embodiment, the power mode is configured into the servo mode at the beginning of the pre-servo gate period, and then configured into the read mode at the end of the servo gate period.

Figure 7A:
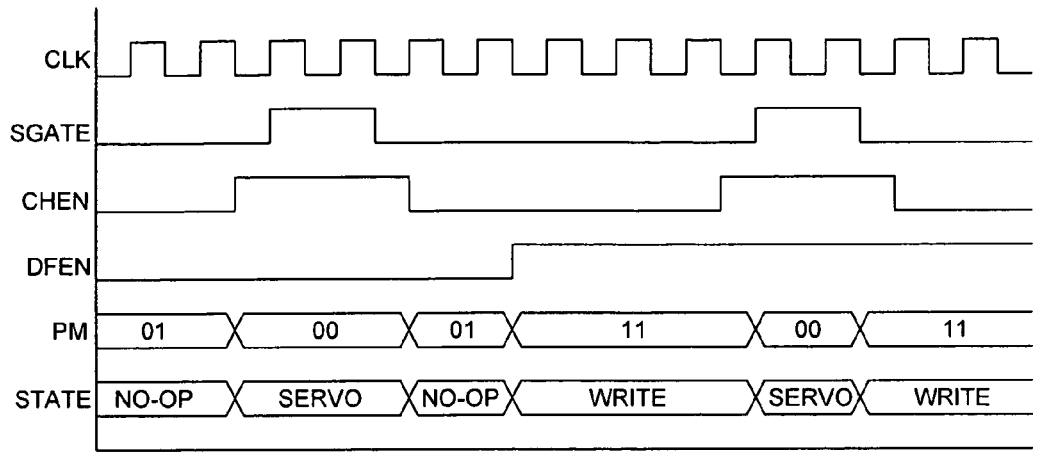
FIGS. 7A and 7B are timing diagrams according to an embodiment of the present invention wherein during execution of a write command the power mode is configured into the servo mode only when reading the servo sector (synchronous with the servo gate).
Figure 7B:
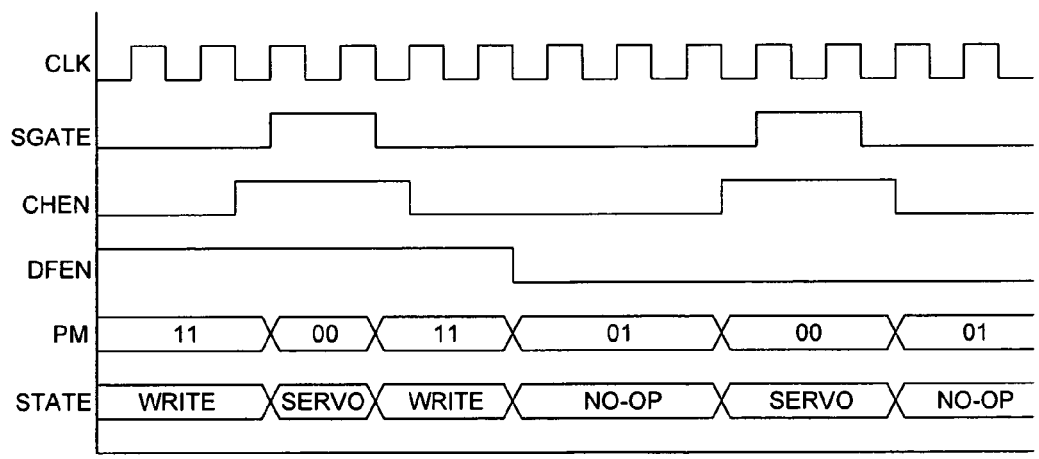

FIGS. 7A and 7B are timing diagrams according to an embodiment of the present invention illustrating when the control circuitry 24 receives a write command from a host. Similar to a read command, while the DFEN signal is enabled the power mode of the read channel is configured into the servo mode only during the servo gate period since the power mode is configured into the write mode during the pre-servo gate and post-servo gate periods.

Figure 7C:
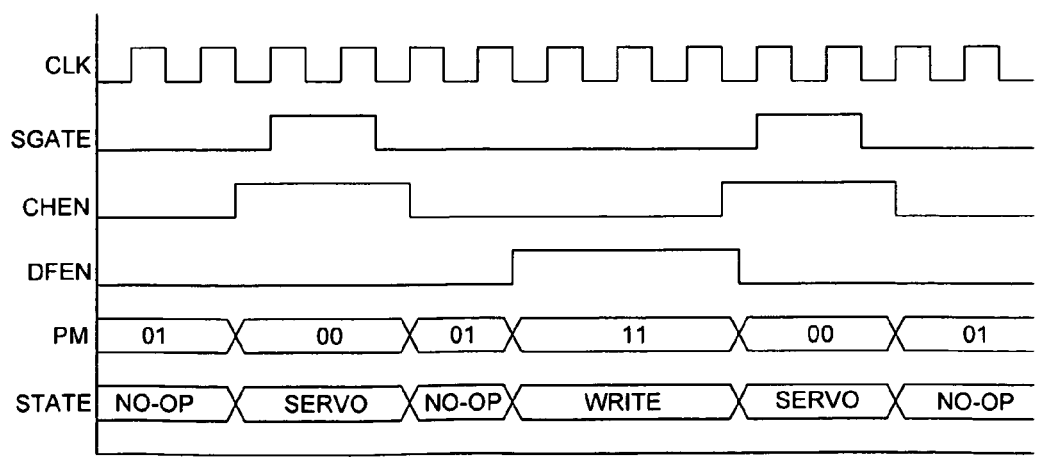
FIG. 7C is a timing diagram according to an embodiment of the present invention wherein when a write command completes during the pre-servo gate period, the power mode is configured into the servo mode after completing the write command and before the end of the pre-servo gate period.

FIG. 7C is a timing diagram according to an embodiment of the present invention wherein the DFEN signal is disabled after completing the write command during the pre-servo-gate period. In this embodiment, the power mode of the read channel is configured into the servo mode during the pre-servo gate period after the DFEN signal is disabled, as well as during the post-servo gate period.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising a plurality of tracks, wherein each track comprises a plurality of data sectors and a plurality of servo sectors;
a head actuated over the disk; and
control circuitry including a read channel, the control circuitry operable to:
configure a power mode of the read channel into a no-op mode;
when the head approaches a servo sector, configure the power mode into a servo mode;
after configuring the power mode into the servo mode, wait for a pre-servo gate period;
after the pre-servo gate period, enable a servo gate to read the servo sector;
after reading the servo sector, disable the servo gate and wait for a post-servo gate period; and
after the post-servo gate period, configure the power mode into the no-op mode.

2. A disk drive comprising:
a disk comprising a plurality of tracks, wherein each track comprises a plurality of data sectors and a plurality of servo sectors;
a head actuated over the disk; and
control circuitry including a read channel, the control circuitry operable to:
receive an access command from a host;
configure a power mode of the read channel into an access mode;
when the head approaches a servo sector, wait for a pre-servo gate period;
after the pre-servo gate period, configure the power mode into a servo mode and enable a servo gate to read the servo sector; and
after reading the servo sector, disable the servo gate, configure the power mode into the access mode, and complete the access command.

3. The disk drive as recited in claim 2, wherein when the access command begins executing during the pre-servo gate period, the control circuitry is further operable to configure the power mode into the servo mode at the beginning of pre-servo gate period.

4. The disk drive as recited in claim 2, wherein when the access command completes during the pre-servo gate period, the control circuitry is further operable to configure the power mode into the servo mode after completing the access command and before the end of the pre-servo gate period.

5. The disk drive as recited in claim 2, wherein the access command is a read command.

6. The disk drive as recited in claim 5, wherein the access mode is a read mode.

7. The disk drive as recited in claim 2, wherein the access command is a write command.

8. The disk drive as recited in claim 7, wherein the access mode is a write mode.

9. A method of operating a disk drive, the disk drive comprising a disk comprising a plurality of tracks, wherein each track comprises a plurality of data sectors and a plurality of servo sectors, a head actuated over the disk, and control circuitry including a read channel, the method comprising:
configuring a power mode of the read channel into a no-op mode;
when the head approaches a servo sector, configuring the power mode into a servo mode;
after configuring the power mode into the servo mode, waiting for a pre-servo gate period;
after the pre-servo gate period, enabling a servo gate to read the servo sector;
after reading the servo sector, disabling the servo gate and waiting for a post-servo gate period; and
after the post-servo gate period, configuring the power mode into the no-op mode.

10. A method of operating a disk drive, the disk drive comprising a disk comprising a plurality of tracks, wherein each track comprises a plurality of data sectors and a plurality of servo sectors, a head actuated over the disk, and control circuitry including a read channel, the method comprising:
receiving an access command from a host;
configuring a power mode of the read channel into an access mode;
when the head approaches a servo sector, waiting for a pre-servo gate period;
after the pre-servo gate period, configuring the power mode into a servo mode and enabling a servo gate to read the servo sector; and
after reading the servo sector, disabling the servo gate, configuring the power mode into the access mode, and completing the access command.

11. The method as recited in claim 10, wherein when the access command begins during the pre-servo gate period, further comprising configuring the power mode into the servo mode at the beginning of pre-servo gate period.

12. The method as recited in claim 10, wherein when the access command completes during the pre-servo gate period, further comprising configuring the power mode into the servo mode after completing the access command and before the end of the pre-servo gate period.

13. The method as recited in claim 10, wherein the access command is a read command.

14. The method as recited in claim 13, wherein the access mode is a read mode.

15. The method as recited in claim 10, wherein the access command is a write command.

16. The method as recited in claim 15, wherein the access mode is a write mode.

* * * * *